US012804796B2

(12) United States Patent
Nishida et al.

(10) Patent No.: US 12,804,796 B2
(45) Date of Patent: Nov. 17, 2026

(54) ACCELERATOR AND PARTICLE THERAPY APPARATUS

(71) Applicant: Hitachi High-Tech Corporation, Tokyo (JP)

(72) Inventors: Kento Nishida, Tokyo (JP); Chishin Hori, Tokyo (JP); Futaro Ebina, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 19/110,489

(22) PCT Filed: Aug. 22, 2023

(86) PCT No.: PCT/JP2023/030100

§ 371 (c)(1),
(2) Date: Mar. 11, 2025

(87) PCT Pub. No.: WO2024/079992

PCT Pub. Date: Apr. 18, 2024

(65) Prior Publication Data

US 2026/0089830 A1 Mar. 26, 2026

(30) Foreign Application Priority Data

Oct. 13, 2022 (JP) ................................ 2022-164718

(51) Int. Cl.
*H05H 7/10* (2006.01)
*H05H 7/04* (2006.01)
*H05H 13/00* (2006.01)

(52) U.S. Cl.
CPC ................ *H05H 7/10* (2013.01); *H05H 7/04* (2013.01); *H05H 13/005* (2013.01); *H05H 2277/11* (2013.01)

(58) Field of Classification Search
CPC H05H 7/04; H05H 7/10; H05H 13/02; H05H 13/005; H05H 2277/11;
(Continued)

(56) References Cited

U.S. PATENT DOCUMENTS

2021/0196984 A1 7/2021 Hae et al.

FOREIGN PATENT DOCUMENTS

JP 2013-165055 A 8/2013
JP 2019-096404 A 6/2019
(Continued)

OTHER PUBLICATIONS

Kento Nishida, et al., "Development of Magnet Design Method for Cotangential Trajectory Accelerator", Proceedings of the 17th Annual Meeting of Particle Accelerator Society of Japn, Sep. 2-4, 2020, online.

(Continued)

*Primary Examiner* — Monica C King
(74) *Attorney, Agent, or Firm* — MATTINGLY & MALUR, PC

(57) ABSTRACT

An accelerator capable of efficiently and satisfactorily extracting a beam is provided. A main magnet A101 applies a main magnetic field to a space between a plurality of main magnetic poles M202 arranged to face each other. An RF kicker M204 causes a beam circulating in a main magnetic field region to which the main magnetic field is applied to be displaced to outside of the main magnetic field region. An extraction channel magnetic field to extract the beam is generated. A canceling magnetic field generation device M214 is provided to be closer to an inner peripheral side than an extraction channel M207 and generates a canceling magnetic field with a polarity opposite to that of a disturbance magnetic field produced by an extraction channel.

14 Claims, 9 Drawing Sheets

(58) Field of Classification Search
CPC .......... H05H 13/00; H05H 7/12; H05H 13/04; H05H 2007/045; A61N 2005/1087; A61N 5/10; A61N 5/1077; A61N 5/1078
See application file for complete search history.

(56) References Cited

FOREIGN PATENT DOCUMENTS

| | | | |
|---|---|---|---|
| JP | 6612307 | B2 | 11/2019 |
| JP | 2020-38797 | A | 3/2020 |
| WO | 2013/098089 | A1 | 7/2013 |
| WO | 2021/261033 | A1 | 12/2021 |

OTHER PUBLICATIONS

W. Kleeven, et al., "Fast computation of magnetic shimming in a high field environment", IBA, Chemin du Cyclotron, 3, 2012.
International Search Report of PCT/JP2023/030100 Oct. 10, 2023.
Extended European Search Report received in corresponding European Application No. 23877000.2 dated Sep. 2, 2026.

ACCELERATOR AND PARTICLE THERAPY APPARATUS

TECHNICAL FIELD

The present disclosure relates to an accelerator and a particle therapy apparatus.

BACKGROUND ART

A particle therapy apparatus that irradiates a tumor with an ion beam obtained by accelerating charged particles such as protons or carbon ions is known. An accelerator that accelerates the charged particles accelerates an ion beam extracted from an ion source or an electron gun until energy required for treatment while controlling an orbit using an electric field and a magnetic field. Typical accelerators for a particle therapy apparatus include a cyclotron, a synchrocyclotron, and a synchrotron that can obtain a beam having an energy of several hundreds MeV order.

The cyclotron and the synchrocyclotron accelerate the beam by applying a radiofrequency electric field synchronized with a circulating cycle of the beam to the beam circularly rotated by a static magnetic field. As the beam obtains more energy by the radiofrequency electric field, the closed orbit radius of the beam becomes larger. Then, the beam is extracted from the circumferentially outermost closed orbit after reaching the highest energy. Therefore, there is a problem that the energy of the beam that can be extracted is a single energy.

On the other hand, the synchrotron is an accelerator that accelerates the beam while keeping the closed orbit radius of the beam constant by temporally changing the intensity of the magnetic field that deflects the beam and the cycle of the accelerating electric field. In the synchrotron, the closed orbit radius is constant, that is, beams having different energies are accelerated on the same closed orbit, and it is thus possible to perform variable energy extraction in which the energy of the beam to be extracted is variable.

In addition, PTL 1 discloses an eccentric trajectory accelerator that enables variable energy to be extracted while using a static magnetic field.

PTL 2 discloses a technique for reducing disturbance to a resonant magnetic field due to an extraction channel magnetic field, which is a problem in resonant extraction in which a beam is extracted using a resonant magnetic field.

NPL 1 describes, as a method for reducing disturbance that is different from that of PTL 2, a method of correcting a disturbance magnetic field of a first harmonic component in a main magnetic field region due to a regenerator magnetic field of a cyclotron accelerator.

NPL 2 describes a technique for optimizing the shape of a main magnetic pole for the purpose of generating a magnetic field distribution required for realizing eccentric beam trajectory arrangement in the eccentric trajectory accelerator described in PTL 1.

CITATION LIST

Patent Literature

PTL 1: JP 2020-38797 A

PTL 2: Japanese Patent No. 6612307

Non-Patent Literature

NPL 1: "Fast Computation of magnetic shimming in a high field environment", W. Kleeven, European Cyclotron Progress Meeting (2012).

NPL 2: "Development of Magnet Design Method for Cotangential Trajectory Accelerator", Kento Nishida, Chishin Hori, Takamichi Aoki, Takamitsu Hae, Proceedings of the 17 th Annual Meeting of Particle Accelerator Society of Japan (2020).

SUMMARY OF INVENTION

Technical Problem

An object of the present disclosure is to provide an accelerator and a particle therapy apparatus capable of efficiently and satisfactorily extracting a beam.

Solution to Problem

An accelerator according to an aspect of the present disclosure is an accelerator that accelerates an ion beam while causing the ion beam to circulate by a main magnetic field and an acceleration radiofrequency electric field, the accelerator including: a main magnetic field generation device that applies the main magnetic field to a space between a plurality of main magnetic poles arranged to face each other; a beam displacement device that causes the ion beam circulating in a main magnetic field region to which the main magnetic field is applied to be displaced to outside of the main magnetic field region; an extraction channel magnetic field generation device that generates an extraction channel magnetic field to extract the ion beam that has been moved to the outside; and a canceling magnetic field generation device that is provided to be closer to an inner periphery side than the extraction channel magnetic field generation device and generates a canceling magnetic field with a polarity opposite to a polarity of the extraction channel magnetic field.

Advantageous Effects of Invention

According to the present invention, it is possible to efficiently and satisfactorily extract a beam.

DESCRIPTION OF EMBODIMENTS

Hereinafter, embodiments of the present disclosure will be described with reference to the drawings

First Embodiment

Figure 1:
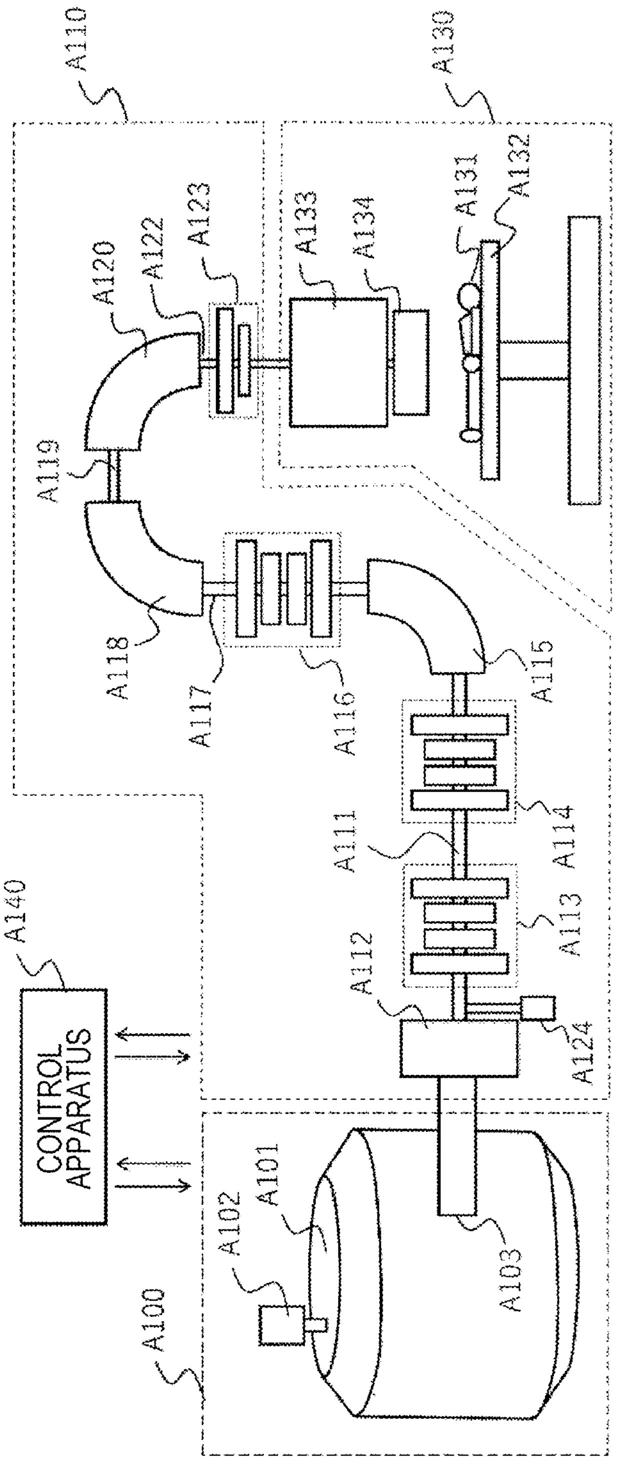
FIG. 1 is a diagram illustrating a particle therapy system according to a first embodiment of the present disclosure.

FIG. 1 is a diagram illustrating a particle therapy system according to a first embodiment of the present disclosure. The particle therapy system illustrated in FIG. 1 is a particle therapy apparatus for performing particle therapy in which a patient to be treated is irradiated with an ion beam that is a particle beam (hereinafter, also simply referred to as a beam). The particle therapy system includes an accelerator A100 that accelerates and extracts a beam, a beam transport line A110 that transports the beam extracted from the accelerator A100, a treatment room A130 for irradiating a patient A131 with the beam transported by the beam transport line A110, and a control apparatus A140 for controlling the accelerator A100 and the beam transport line A110.

The accelerator A100 is a device that generates and extracts a beam of an energy band used for particle therapy. The accelerator A100 includes an ion source system A102 that implants ions to form a beam, a main magnet A101 that internally accelerates the ions from the ion source system A102 as a beam, and an extraction port A103 which is an outlet for taking out and extracting the beam accelerated by the main magnet A101 to the outside.

The ion source system A102 is, for example, an internal ion source using a cold cathode or an external ion source using a radiofrequency source. In the present embodiment, the ion source system A102 is an external ion source and is attached to the main magnet A101 as illustrated in FIG. 1. Note that in a case where the ion source system A102 is an internal ion source, a cold cathode electrode serving as a main body of the ion source system A102 is attached inside the main magnet A101 and is further connected to a gas introduction path and a power supply. Also, the type of the ion is not particularly limited and is, for example, a proton or a carbon ion.

The main magnet A101 generates a main magnetic field for causing the beam to circulate. The main magnetic field is a magnetic field distribution to be applied to cause the beam to circulate in a predetermined equilibrium trajectory. Specifically, the main magnet A101 is formed to be substantially vertically symmetric and includes therein an acceleration space for accelerating the beam while causing the beam to circulate. The main magnet A101 applies a Lorentz force to the acceleration space by causing the main magnetic field to act on the ions implanted by the ion source system A102 and forms a beam by causing the ions to circulate along a circular trajectory. The beam is accelerated to achieve a desired energy by a radiofrequency electric field generated inside the main magnet A101 and is then extracted to the outside of the accelerator A100 via the extraction port A103. A series of device operations related to ion injection (implantation) and beam acceleration and extraction are controlled by the control apparatus A140.

The beam transport line A110 transports the beam extracted from the accelerator A100 to the treatment room A130. The beam transport line A110 comprehensively handles beams having different characteristics for each energy and transports the beams while correcting beam emittances and energy variations of each beam. The beam transport line A110 includes beam pipes A111, A117, A119, and A122 through which a beam passes, bending magnets A112, A115, A118, and A120 for adjusting a traveling direction of the beam, and convergence magnets A113, A114, A116, and A123 for controlling a beam shape.

The inside of the beam pipes A111, A117, A119, and A122 is evacuated using a vacuum pump A124 such as an ion pump or a turbo molecular pump to prevent the beam from colliding against neutral gas and being lost. The bending magnets A112, A115, A118 and A120 are arranged such that the beam travels along the beam pipes A111, A117, A119 and A122. The convergence magnets A113, A114, A116, and A123 are configured such that the emittance and energy of the beam can be adjusted by a convergence or divergence effect. The bending magnets A112, A115, A118, and A120 and the convergence magnets A113, A114, A116, and A123 are controlled by the control apparatus A140. Note that although the beam transport line A110 transports a beam from one accelerator A100 to one treatment room A130 in FIG. 1, beams may be transported from one accelerator A100 to a plurality of treatment rooms A130.

The treatment room A130 includes a bed A132 for fixing the patient A131 and irradiation devices A133 and A134 for irradiating the patient A131 with the beam transported by the beam transport line A110.

The irradiation devices A133 and A134 have a function of changing the shape and the energy distribution of the beam transported by the beam transport line A110 to be suitable for therapy. The irradiation devices A133 and A134 may be configured to include a collimator for scraping off unnecessary portions of a beam, a ridge filter for expanding an irradiation range in a depth direction with respect to a tumor by expanding an energy distribution of the beam, a range shifter for finely adjusting a position which the beam reaches, and various monitors for monitoring a beam irradiation dose and a beam profile, for example, which are arranged therein. Furthermore, the irradiation devices A133 and A134 have an irradiation mechanism for irradiating a desired position with the beam. For example, the irradiation mechanism may be configured to be able to irradiate the treatment target with the beam from an arbitrary angle using a rotatable gantry, and may be configured to include a scanning magnet that deflects the beam.

Figure 2:
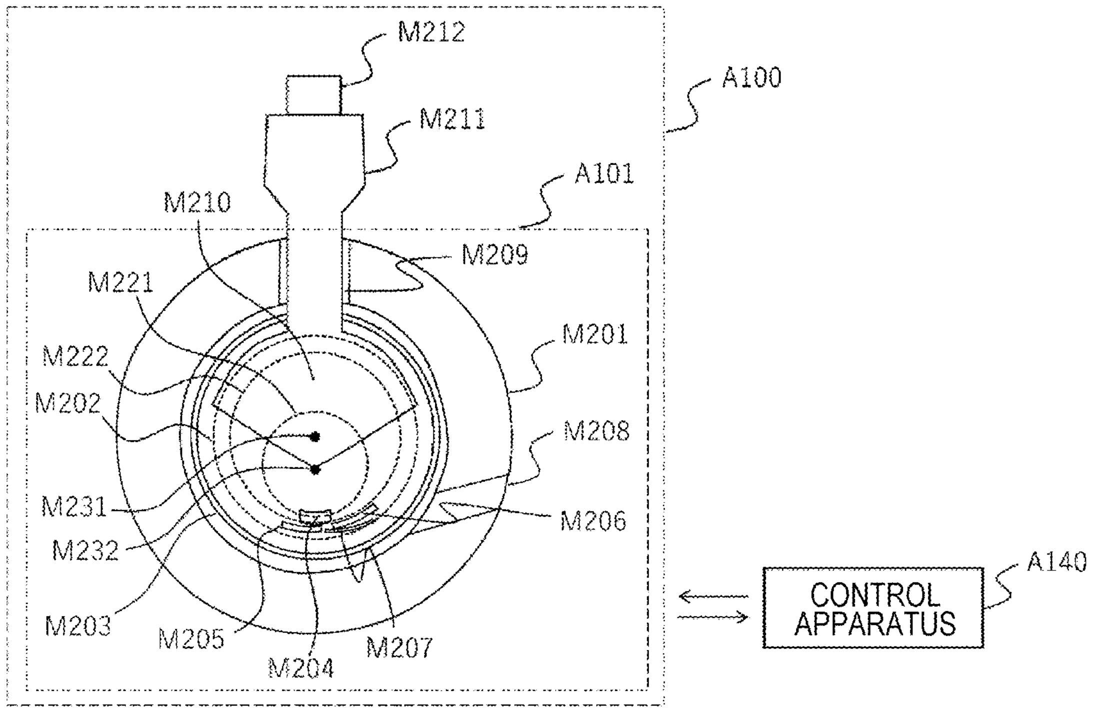
FIG. 2 is a configuration diagram illustrating a configuration example of an accelerator.

FIG. 2 is a configuration diagram illustrating a configuration example of the accelerator A100, and is a horizontal sectional view taken along a central plane which is a geometric central plane of the accelerator A100 in the up-down direction. Note that in the present embodiment, the accelerator A100 is an accelerator that extracts a beam using a resonant magnetic field, and an eccentric trajectory-type circular accelerator will be described below as an example.

The accelerator A100 is an accelerator designed such that a main magnetic field through which a beam passes during acceleration is not symmetric in a circumferential direction and beam orbits of beams having mutually different energies form a set of circular orbits eccentric to each other. The eccentric trajectory-type accelerator A100 forms a trajectory aggregation portion where beam trajectories of beams having mutually different energies are close to each other, and all beams having energies to be extracted pass through a narrow space in the vicinity of the trajectory aggregation portion. Therefore, it is possible to perform variable energy extraction by causing the electric field and a magnetic field for beam extraction to act on the narrow space. Note that since the accelerator A100 uses a static magnetic field, a temporal change in magnetic field intensity is not necessary, and it is possible to achieve size reduction by increasing the intensity of the magnetic field using a superconducting coil for the main magnet.

The accelerator A100 includes a displacement unit, a resonant magnetic field region, and a septum magnet as a variable energy extraction mechanism that enables variable energy extraction. The displacement unit and the resonant magnetic field region constitute a beam displacement device. Note that in a case where the septum magnet is configured only of a ferromagnetic body without using a coil, the septum magnet is often referred to as an extraction channel.

The displacement unit has a role of drawing out the beam trajectory to the outside of the main magnetic field region by giving perturbation in the horizontal direction (the radial direction of the magnet) to the beam circulating on the eccentric trajectory and causing resonance. The perturbation in the horizontal direction is given by an RF kicker, and the perturbed beam travels on the radially outer peripheral side in a view from an equilibrium trajectory and is affected by the resonant magnetic field. The resonant magnetic field is a higher order magnetic field including at least quadrupole magnetic field components and includes a peeler magnetic field having a magnetic field gradient in a direction of weakening the main magnetic field toward the radially outer peripheral side and a regenerator magnetic field having a magnetic field gradient in a direction of strengthening the main magnetic field toward the radially outer peripheral side. These magnetic fields are formed over a predetermined azimuthal angle region on the outer peripheral side of the maximum extraction energy trajectory. In addition, the peeler magnetic field region is arranged on the upstream side, and the regenerator magnetic field region is arranged on the downstream side, with respect to the beam traveling direction. These two magnetic field regions will be collectively referred to as a resonant magnetic field region. The beam is kicked on the outer peripheral side by passing through the peeler magnetic field region and is kicked on the inner peripheral side by passing through the regenerator magnetic field region. The peeler magnetic field region and the regenerator magnetic field are adjusted to have a tune of about 1 and further have a magnetic field gradient of increasing the intensity toward the radially outer peripheral side. For this reason, the beam gradually moves to the radially outer peripheral side every turn, is more strongly affected by the peeler/regenerator magnetic field region, and is brought into a resonance state in which the amount of kicking gradually increases. Then, a turn separation that is a difference in position in the radial direction through which the beam passes per turn becomes equal to or greater than a specific value, the beam is affected by a septum magnet that generates an extraction magnetic field in the next stage. The septum magnet is used to generate an extraction channel magnetic field with a polarity opposite to that of a main magnetic field that causes the beam to circulate and deflect the beam to an extraction trajectory where the beam is not under influences of the main magnetic field. The beam that has entered the trajectory region where the beam is affected by the septum magnet is deflected to the extraction trajectory by the extraction channel magnetic field and is extracted to the outside of the accelerator through the extraction trajectory.

As described above, the accelerator A100 includes the main magnet A101 that generates the main magnetic field for confining the beam therein. The main magnet A101 includes a yoke M201, a main magnetic pole M202, a coil M203, a radio frequency (RF) kicker M204 which is an extraction radiofrequency application device, a peeler magnetic field region M205 and a regenerator magnetic field region M206 which are a resonant magnetic field region, and an extraction channel M207. The yoke M201, the main magnetic pole M202, and the coil M203 are main components of the main magnetic field generation device that generates the main magnetic field.

A pair of yoke M201 and main magnetic pole M202 are provided on the upper and lower sides to face each other. The main magnetic pole M202 is provided at an inner peripheral portion of the yoke M201, and the yoke M201 and the main magnetic pole M202 constitute an outer shell of the main magnet A101. The yoke M201 and the main magnetic pole M202 are also used as support members that support the coil M203, the extraction channel M207, and the like. An acceleration space, which is a space for the beam to circulate, is formed inside the main magnet A101 (more specifically, between the pair of main magnetic poles M202 on the upper and lower sides), and the main magnetic pole M202 applies a main magnetic field for causing the beam to circulate in the acceleration space. The main magnetic field is not symmetrical in the circumferential direction, and the accelerator A100 is designed such that beam trajectories of beams having mutually different energies form a set of mutually eccentric circular trajectories. The acceleration space is evacuated to reduce a loss due to collisions of the beam against neutral particles. Note that the yoke M201 and the main magnetic pole M202 are formed substantially vertically symmetrically with respect to the central plane, and in this case, the traveling plane through which the beam travels substantially coincides with the central plane of the accelerator A100.

The yoke M201 is formed with an extraction port through-hole M208 into which an extraction port A103 for extracting a beam to the outside is inserted. In addition, an acceleration electrode M210 that generates an acceleration radiofrequency electric field to accelerate the beam is arranged inside the main magnet A101, and the acceleration electrode M210 is connected to a rotating capacitor M211 for frequency modulation provided outside the main magnet A101. The acceleration radiofrequency electric field is an electric field that gives energy to the beam by applying a radiofrequency electric field synchronized with the circulating cycle of the beam. The rotating capacitor M211 has a counter electrode capable of changing the effective area of the counter electrode by rotation, and the capacitance is changed by changing the area using the rotating capacitor driving power machine M212. Once the capacitance of the rotating capacitor M211 changes, the resonant frequency of the acceleration electrode M210 is changed, thereby enabling frequency modulation of the acceleration radiofrequency electric field in accordance with the beam energy. The acceleration electrode M210 and the rotating capacitor M211 are connected via an acceleration electrode through-hole M209 formed in the yoke M201. Note that a through-hole may be formed as needed in the yoke M201 separately from the extraction port through-hole M208 and the acceleration electrode through-hole M209. For example, the yoke M201 may be provided with a through-hole for monitoring the beam.

The coil M203 is a pair of superconducting coils, and each superconducting coil is arranged substantially plane-symmetrically with respect to a central plane M233 (see FIG. 3), which is a geometric center section in the up-down direction, and is provided along the inner periphery of the yoke M201.

FIG. 2 illustrates a geometric center position M231 of the main magnet A101 and an ion injection position M232. In a case where the yoke M201 and the coil M203 are substantially circumferentially symmetric, for example, the geometric center position M231 is the center position thereof. The injection position M232 is a position shifted from the geometric center position M231 and corresponds to the center of the closed orbit along which the beam circulates. In addition, FIG. 2 illustrates a beam closed orbit M221 along which the beam having the lowest energy to be extracted from the accelerator A100 circulates and a beam closed orbit M222 along which the beam having the highest energy to be extracted from the accelerator A100 circulates. The lowest energy is, for example, 70 MeV, and the highest energy is, for example, 230 MeV.

The RF kicker M204 is a displacement unit that applies an extraction radiofrequency electric field for extracting a beam to the beams of all energies to be extracted to thereby cause the beam circulating in the main magnetic field region to which the main magnetic field is applied to be displaced to outside. The main magnetic field region is a region through which the beam passes when the beam is accelerated to predetermined energy by the radiofrequency electric field, and is a set of equilibrium trajectories of each energy.

The peeler magnetic field region M205 and the regenerator magnetic field region M206 configure a resonant magnetic field region in which a resonant magnetic field that gives resonance to the beam that has been displaced to the outside of the main magnetic field region by the RF kicker M204 is formed. The resonant magnetic field region is arranged in a predetermined azimuthal angle region at an outer peripheral portion (specifically, closer to the outer peripheral side than the beam closed orbit M222 having the highest energy) of the main magnetic field region. The peeler magnetic field region M205 is arranged on the side further upstream than the regenerator magnetic field region M206 with respect to the beam traveling direction. A peeler magnetic field having a magnetic field gradient in a direction of weakening the main magnetic field toward the radially outer peripheral side is formed in the peeler magnetic field region M205, and a regenerator magnetic field having a magnetic field gradient in a direction of strengthening the main magnetic field toward the radially outer peripheral side is formed in the regenerator magnetic field region M206. The peeler magnetic field acts on the beam such that the beam is caused to move radially outward, and the regenerator magnetic field acts on the beam such that the beam is caused to move radially inward.

The extraction channel M207 is a device that generates an extraction channel magnetic field for extracting the beam to the outside in the radial direction. Specifically, the extraction channel magnetic field is a magnetic field used when a beam accelerated to reach a predetermined energy is separated to a region where the beam is not affected by the main magnetic field. The accelerated beam is set to have appropriate bipolar magnetic field components and quadrupole magnetic field components such that the beam is stably transported to the extraction port. The extraction channel magnetic field generation device is a device that generates the extraction channel magnetic field. The extraction channel magnetic field generation device is arranged on the downstream side of the resonant magnetic field region with respect to the traveling direction of the extracted beam and stably extracts the beam while adjusting the extraction trajectory of the extracted beam with the bipolar magnetic field components and giving appropriate convergence and divergence to the extracted beam with the quadrupole magnetic field components. The extraction channel M207 in the present embodiment is arranged such that the radial position thereof is located closer to the outer peripheral side than the peeler magnetic field region M205 and the regenerator magnetic field region M206. Also, the extraction channel M207 is arranged on the side further downstream than the peeler magnetic field region M205 with respect to the beam traveling direction.

Figure 3:
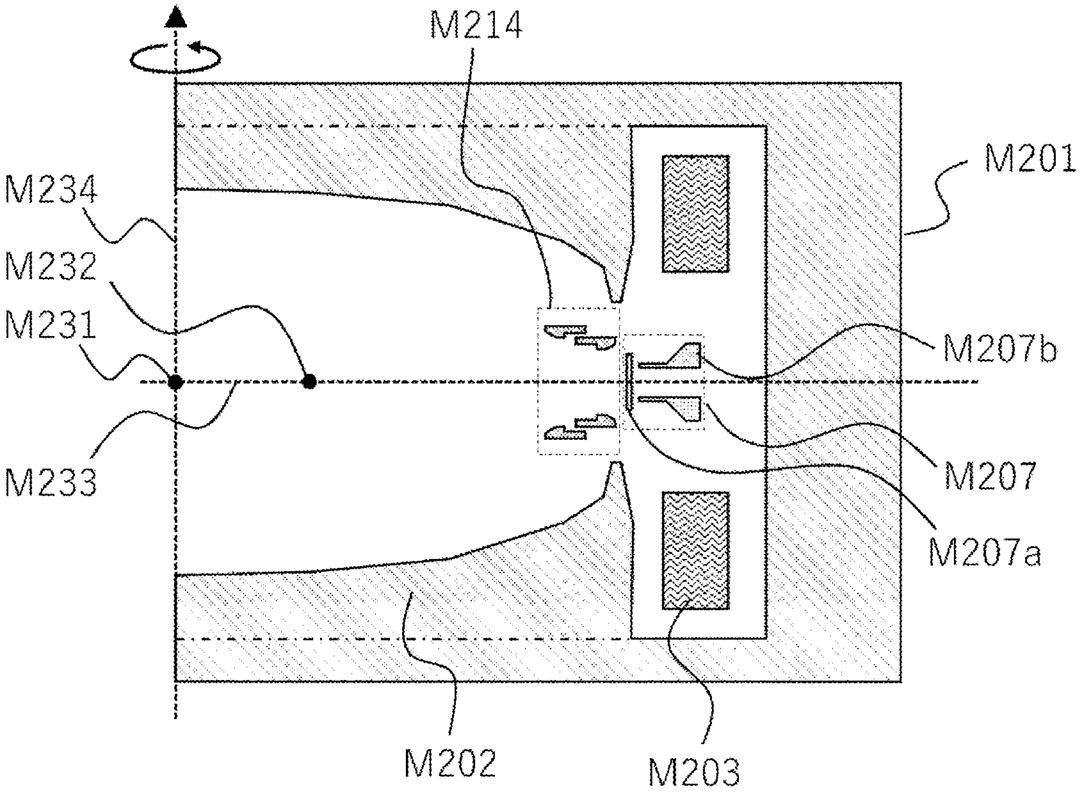
FIG. 3 is a longitudinal sectional view along a vertical plane of a main magnet.

FIG. 3 is a longitudinal sectional view taken along a vertical plane of the main magnet A101, and more specifically, is a longitudinal sectional view taken along a vertical plane extending in a downward direction in the drawing (a direction at an azimuth angle of −90°) from the central plane M233 in FIG. 2.

FIG. 3 schematically illustrates the yoke M201, the main magnetic pole M202, the coil M203, the extraction channel M207, and a canceling magnetic field generation devices M214, which will be described later. Furthermore, the central plane M233, which is a geometric central plane in the up-down direction, of the main magnet A101 and an axial direction M234 of the main magnet A101 facing a direction perpendicular to the central plane M233 are illustrated. In FIG. 3, the acceleration region where the beam is accelerated is present on the inner peripheral side in the radial direction, and the extraction trajectory region before the beam is extracted after the beam leaves the acceleration region is present on the outer peripheral side in the radial direction.

The extraction channel M207 is formed to have a pair of one or more magnetic materials on upper and lower sides and has a function of weakening the main magnetic field generated in the substantially axial direction M234. In the example of FIG. 3, the extraction channel M207 includes an extraction channel partitioning wall portion M207*a* and an extraction channel adjustment portion M207*b*.

The extraction channel partitioning wall portion M207*a* is a partitioning wall portion that is formed of a magnetic material extending vertically symmetrically in the substantially up-down direction from the central plane M233 and is arranged to serve as a partitioning wall for the inside and the outside in the radial direction. Since the extraction channel partitioning wall portion M207*a* is formed of a magnetic material, magnetic permeability is sufficiently higher than that of the surroundings. For this reason, magnetic fluxes in the vicinity are attracted to the extraction channel partitioning wall portion M207*a*, and the magnetic flux density in the region adjacent to the inside and outside in the radial direction in which the magnetic fluxes are attracted decreases. It is thus possible to cause the main magnetic field to suddenly drop in the vicinity of the extraction channel partitioning wall portion M207*a* and to pull apart the beam from the main magnetic field.

The extraction channel adjustment portion M207*b* is formed of a pair of magnetic materials arranged vertically symmetrically with the central plane M233 interposed therebetween and has a function of guiding the beam to the extraction port A103 while controlling convergence and divergence.

An extraction channel magnetic field that realizes a desired arrival position, shape, and the like of the beam is generated by adjusting the positions and the shapes of the extraction channel partitioning wall channel portion M207*a* and the extraction channel adjustment portion M207*b*.

Figure 4:
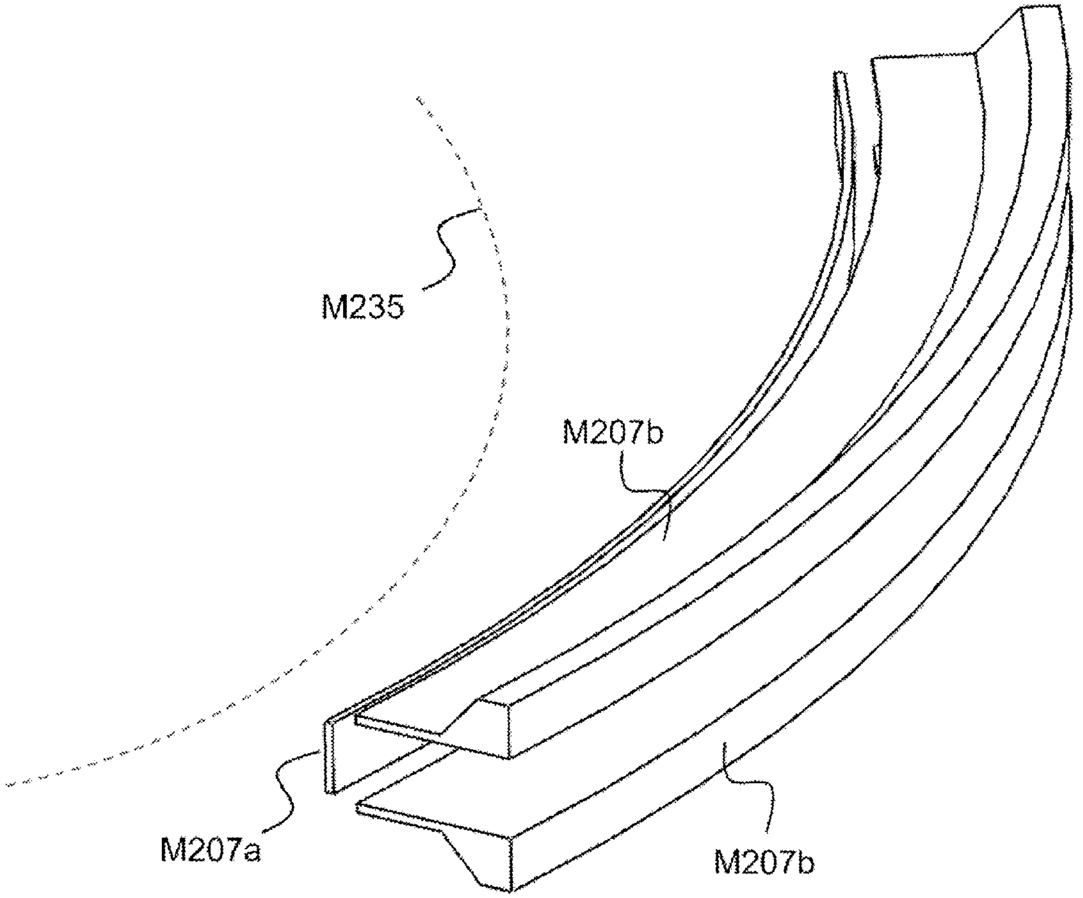
FIG. 4 is a schematic view illustrating an example of an extraction channel.

FIG. 4 is a schematic view illustrating an example of the extraction channel M207.

As illustrated in FIG. 4, the shape of the extraction channel M207 in the beam traveling direction in which the beam travels is a shape obtained by extending a sectional shape in the substantially vertical direction along the beam traveling direction of the extraction trajectory. The extraction trajectory of the beam is a trajectory before the beam is extracted after the beam leaves the closed orbit, and the beam traveling direction of the extraction trajectory is set to spread to the outer peripheral side in a view from the center of the main magnet A101 with respect to the closed orbit M235. Due to the aforementioned shape of the extraction channel M207, the beam is gradually pulled apart from the center of the main magnetic field as the beam further travels. Since the magnetic field intensity of the main magnetic field further decreases as the beam further moves to the outer peripheral side in the extraction channel M207, the beam is subjected to divergence in the horizontal direction by a strong magnetic field gradient. In a case where the divergence in the horizontal direction is excessive, the beam is corrected using a magnetic field generated in the extraction trajectory by the pair of extraction channel adjustment portions M207*b* on the upper and lower sides. Therefore, the extraction channel M207 has different sectional shapes at each position in the beam traveling direction, and a magnetic field distribution corresponding to the traveling of the beam along the extraction trajectory is generated.

Figure 5:
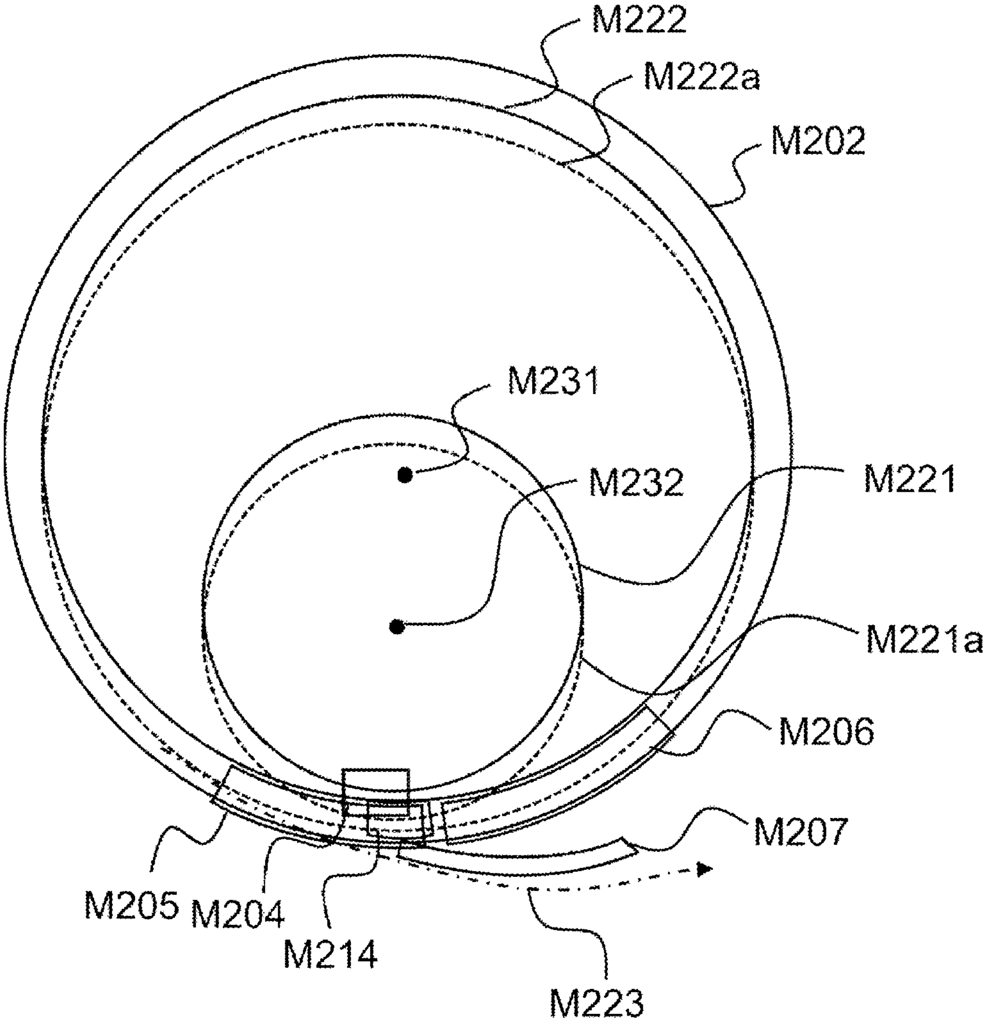
FIG. 5 is a diagram for explaining extraction of a beam by resonance using a resonant magnetic field generated in a resonant magnetic field region.

FIG. 5 is a diagram for explaining resonant extraction of a beam using a resonant magnetic field formed in a resonant magnetic field region.

As illustrated in FIG. 5, the peeler magnetic field region M205 and the regenerator magnetic field region M206, which are resonant magnetic field regions, are present on the side further outward in the radial direction than the beam closed orbits M221 and M222. Therefore, the beam is not affected by the resonant magnetic field in a state where the RF kicker M204 does not operate. Once the RF kicker M204 operates and the extraction radiofrequency electric field generated by the RF kicker M204 is applied to the beam, the trajectory of the beam is displaced in the horizontal direction, and the beam passes through the resonant magnetic field region. As a result, the beam reaches the side further outward than the beam closed orbits M221 and M222 as illustrated as beam trajectories M221*a* and M222*a*. Then, once the beam reaches a position closer to the outer peripheral side than the extraction channel partitioning wall portion M207*a* (see FIG. 3) of the extraction channel M207, the beam is pulled apart from the main magnetic field and is guided along the extraction trajectory M223 to the extraction port A103.

At this time, since the beam passes the closed orbit located further inward as the energy of the beam is lower, more trajectory displacement is needed for the beam to reach the inlet of the extraction channel M207. On the other hand, a low-energy beam has a smaller momentum than that of a high-energy beam and thus has a smaller amount of kicking at the same magnetic field intensity. Therefore, it is more difficult for the low-energy beam to satisfy beam extraction conditions than the high-energy beam, and extraction efficiency of the low-energy beam is degraded. In order to improve emission efficiency of the low-energy beam, it is only necessary to reduce the required amount of trajectory displacement by causing the extraction channel M207 to approach the beam closed orbit M221 of the lowest energy.

However, if the extraction channel M207 is caused to approach the beam closed orbit M221 of the lowest energy, a disturbance magnetic field generated on the radially inner peripheral side on the central plane M233 by the extraction channel M207 increases. In a case where the extraction channel M207 includes the extraction channel partitioning wall portion M207*a* illustrated in FIG. 3, in particular, the distance from the magnetic material forming the extraction channel M207 to the peeler magnetic field region M205 is short, and the extraction channel M207 thus generates a high-intensity disturbance magnetic field in the peeler magnetic field region M205. This disturbance magnetic field disturbs the peeler magnetic field, and a beam behavior during resonance is significantly likely to be affected by the peeler magnetic field. For this reason, once the high-intensity disturbance magnetic field is generated in the peeler magnetic field region M205, the peeler magnetic field deviates from a desired magnetic field distribution, and it becomes difficult to satisfactorily extract the beam.

On the other hand, the accelerator A100 includes the canceling magnetic field generation devices M214 as illustrated in FIG. 3 in order to cancel out the high-intensity disturbance magnetic field generated in the peeler magnetic field region M205 by the extraction channel M207 in the present embodiment.

The canceling magnetic field generation devices M214 are devices that generate a canceling magnetic field for canceling out the disturbance magnetic field generated in the peeler portion resonant magnetic field region by the extraction channel M207. The canceling magnetic field has a polarity opposite to that of the disturbance magnetic field generated in the peeler resonant field both devices by the extraction channel.

The canceling magnetic field generation devices M214 are devices that generate a magnetic field for generating a canceling magnetic field and can be configured of any of or a combination of a ferromagnetic body, a coil, and a permanent magnet. In the present embodiment, description will be given using an example in which the canceling magnetic field generation devices M214 are configured of a ferromagnetic material such as iron. In addition, a plurality of canceling magnetic field generation devices M214 are arranged plane-symmetrically with respect to the central plane M233. Also, the canceling magnetic field generation devices M214 are arranged such that the canceling magnetic field generation devices M214 overlap the peeler magnetic field region M205 in a view from the up-down direction. With this arrangement, it is possible to accurately cancel out the disturbance magnetic field generated by the extraction channel M207.

Figure 6:
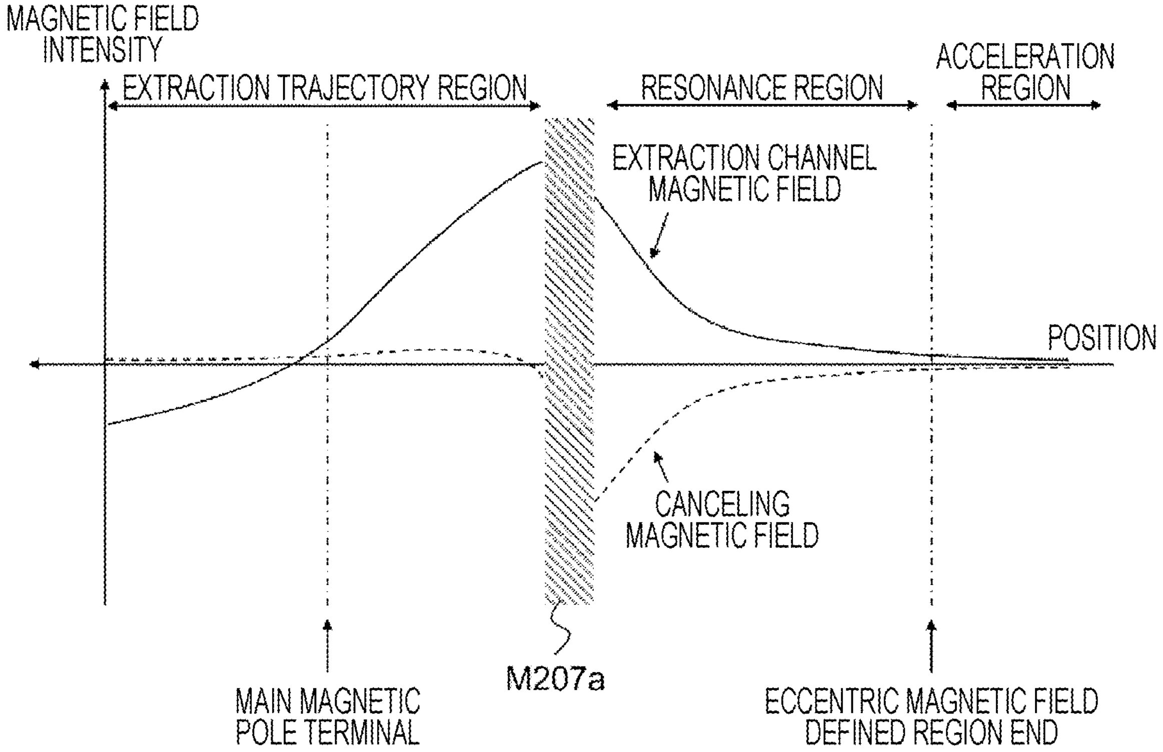
FIG. 6 is a diagram illustrating an example of an extraction channel magnetic field and a canceling magnetic field.

FIG. 6 is a diagram illustrating an example of a disturbance magnetic field (solid line) and a canceling magnetic field (dashed line) by the extraction channel. Note that in FIG. 6, the vertical axis represents the magnetic field intensity and the horizontal axis represents the position in the radial direction on the central plane M233. More specifically, the horizontal axis represents the position in the radial direction along the downward direction in the drawing (direction of azimuth angle of −90°) from the geometric center position M231 of the main magnet A101 illustrated in FIG. 2. In FIG. 6, the left direction is the outer peripheral side of the main magnet A101, the right direction is the inner peripheral side of the main magnet A101, and the beam moves from the inner peripheral side in the order of the acceleration region, the resonant magnetic field region, and the extraction trajectory region and is extracted to the outside of the accelerator A100.

An extraction channel partition M207*a* is provided at the boundary between the resonant region and the extraction trajectory region. As for the magnetic field distribution in the extraction trajectory region, an extraction channel magnetic field having a polarity opposite to that of the strong main magnetic field is formed in the vicinity of the extraction channel partitioning wall portion M207*a* as illustrated in FIG. 6, and the beam is thereby pulled apart from the main magnetic field. However, an extraction channel magnetic field with a similar strong opposite polarity is generated in the resonant region on the inner peripheral side of the extraction channel partitioning wall portion M207*a* as well, and this leads to a disturbance magnetic field that disturbs the resonance state of the beam. If canceling magnetic field that cancels out the extraction channel magnetic field in the resonant region as illustrated in FIG. 6 is generated, then it is possible to obtain a satisfactory resonance state of the beam.

In the example of FIG. 3, the canceling magnetic field generation devices M214 are supported by the main magnet A101 and the like by a non-magnetic body (not illustrated) and are arranged in a gap between the pair of main magnetic poles M202 on the upper and lower sides. As a result, the canceling magnetic field generation devices M214 can be installed in the vicinity of the region where the beam travels. However, the canceling magnetic field generation devices M214 are not limited to this configuration and may be arranged in contact with the main magnetic pole M202. However, in a case where the main magnetic pole M202 and the canceling magnetic field generation devices M214 are integrally formed, the canceling magnetic field generation devices M214 and the central plane M233 are separated from each other, and the magnetic field intensity per unit volume of the canceling magnetic field in the central plane M233 thus decreases. There is a concern that if the magnetic body (ferromagnetic material) forming the canceling magnetic field generation devices M214 is increased in order to compensate for this, unevenness of the surface of the main magnetic pole M202 may become severe, and it may become difficult to process the main magnetic pole M202. In addition, there is also a concern that if the canceling magnetic field generation devices M214 are separated from each other, the generation range in which the canceling magnetic field generation devices M214 generate the peeler magnetic field is widened, and the canceling magnetic field generation devices M214 may thus become a factor of a disturbance magnetic field for another region such as a main magnetic field region. Since a device for beam extraction, a device for beam monitoring, and the like are typically provided in the vicinity of the trajectory aggregation portion of the beam trajectory, in particular, there is also a concern that magnetic interference from the canceling magnetic field generation devices M214 increases. Therefore, it is desirable that the canceling magnetic field generation devices M214 be arranged in the vicinity of the central plane M233 such that a sufficient effect can be obtained with a small amount of magnetic body.

Figure 7:
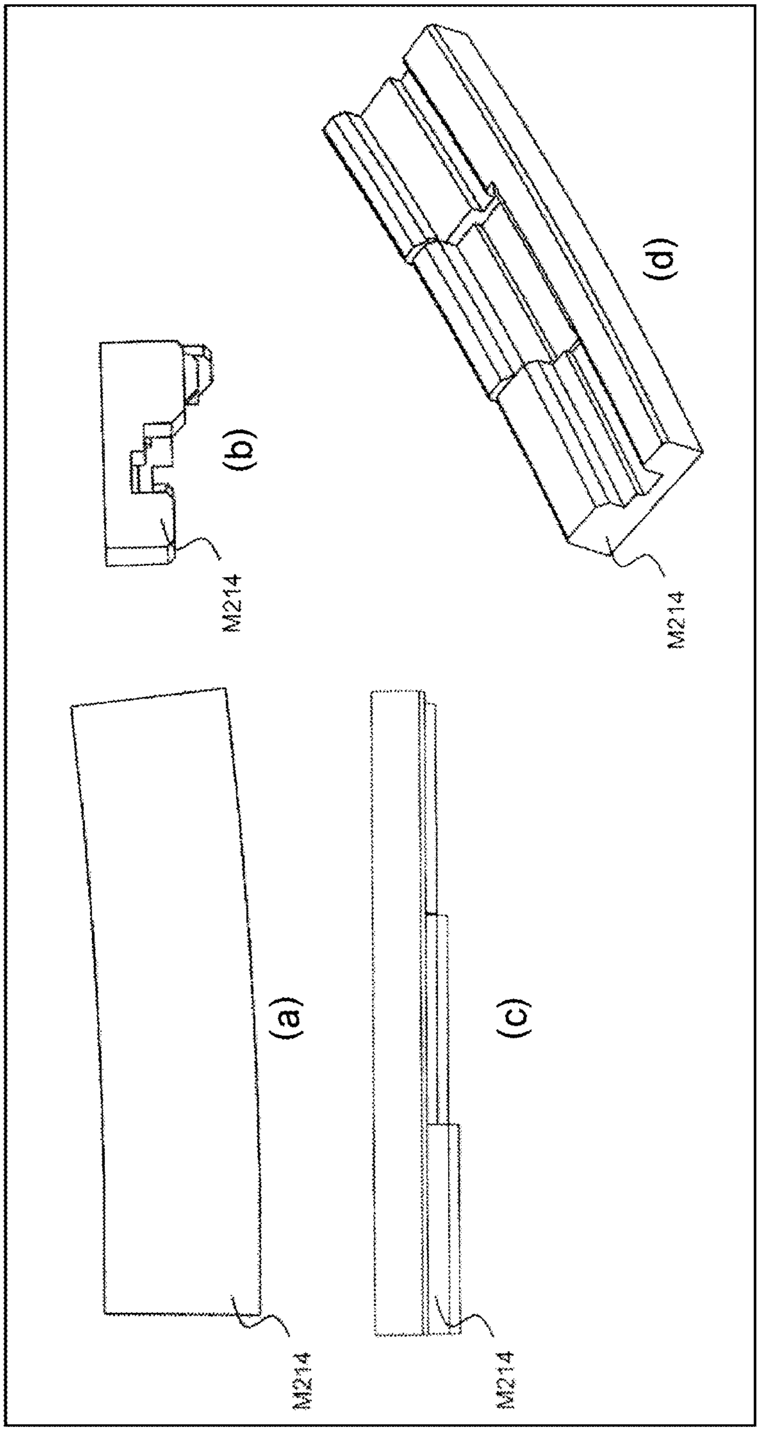
FIG. 7 is a diagram illustrating a structure example of a canceling magnetic field generation device according to the first embodiment of the present disclosure.

FIG. 7 is a diagram illustrating a structure example of the canceling magnetic field generation devices M214. In FIG. 7, only one of the pair of canceling magnetic field generation devices M214 arranged on the upper and lower sides with the central plane M233 sandwiched therebetween is illustrated. Also, FIG. 7(*a*) is a plan view seen from a side opposite to the central plane M233, FIG. 7(*b*) is a plan view seen from the right side of FIG. 3, FIG. 7(*c*) is a plan view seen from a direction perpendicular to FIG. 3, and FIG. 7(*d*) is a perspective view seen from the side of the central plane M233.

The canceling magnetic field generation devices M214 have a curved shape along the peeler magnetic field region M205 illustrated in FIG. 4 and are arranged to sandwich a region (at least a part of the peeler magnetic field region M205) as a target where the disturbance magnetic field is to be canceled out. The shape (such as the thickness at each position) of the canceling magnetic field generation devices M214 is determined in accordance with the intensity distribution of the disturbance magnetic field formed in the peeler magnetic field region M205 by the extraction channel M207. For example, the thickness of the canceling magnetic field generation devices M214 is designed to change along both the circumferential direction and the radial direction and obtain a desired peeler magnetic field.

Examples of a method for determining the shape of the canceling magnetic field generation device M214 include a repetitive method of repeating numerical calculation and shape change. In this method, a magnetic field generated by the extraction channel at each position and a canceling magnetic field are calculated through numerical calculation, and the shape of the canceling magnetic field generation devices M214 is adjusted such that the disturbance magnetic field due to the extraction channel is canceled out. Finite element analysis or the technique described in NPL 1 may be used for the numerical calculation of the magnetic field and the canceling magnetic field generated by the extraction channel. In a case where the finite element analysis is used, it may be assumed that the main magnet A101, the extraction channel M207, and the canceling magnetic field generation devices M214 are substantially axisymmetric in order to curb an increase in calculation time. In this case, the shape of the canceling magnetic field generation devices M214 may be corrected in consideration of the shape being non-axisymmetric after the shape of the canceling magnetic field generation devices M214 is determined using the assumption.

Note that NPL 2 describes a method of generating a desired magnetic field distribution by deforming the shape of the main magnetic pole M202 in the main magnet A101. In this method, a difference between a magnetic field distribution generated by the main magnet of the eccentric trajectory accelerator and obtained through measurement or calculation and a target magnetic field distribution is calculated first, and then the difference is removed by adding or removing the magnetic material to or from the main magnetic pole surface of the main magnet. Specifically, the optimum arrangement of the magnetic material to be added to or removed from the surface of the main magnetic pole is calculated by inverse analysis based on the least squares method, and the arrangement is reflected to a numerical calculation model or the like, thereby calculating the shape of the main magnet that generates a non-uniform magnetic field distribution like that of an eccentric trajectory accelerator. This method may be used together when the shape of the canceling magnetic field generation devices M214 in the present embodiment is determined. For example, it is possible to further reduce the disturbance magnetic field by performing optimization of the shape of the main magnetic pole M202 using the method descried in NPL 2 after the approximate shape of the canceling magnetic field generation device is determined using an infinite element analysis or the like such that the disturbance magnetic field is substantially cancelled out. In addition, the method described in NPL 2 may be directly applied to the determination of the shape of the canceling magnetic field generation devices M214 in the present embodiment.

Note that the magnetic field distribution of the magnetic fields formed by the extraction channel M207 and the main magnet A101 is also changed if the shape of the canceling magnetic field generation devices M214 is changed, and further, the magnetic field distribution of the magnetic field formed by the canceling magnetic field generation devices M214 is changed if the shape of the extraction channel M207 is changed. Therefore, repetitive processing is often required to determine the shape of the canceling magnetic field generation devices M214.

In the example of FIG. 3, the canceling magnetic field generation devices M214 are installed in the vicinity of the region where the beam travels, and influences of the canceling magnetic field generation devices M214 thus have high sensitivity to the arrangement position. Therefore, the accelerator A100 may have a jig for accurately arranging the canceling magnetic field generation devices M214 at designed positions, or a position adjustment mechanism capable of finely adjusting the positions of the canceling magnetic field generation devices M214. Also, the canceling magnetic field generation devices M214 may be integrated with the RF kicker M204, the extraction channel M207, or the like. In a case where the canceling magnetic field generation device M214 is integrated with the extraction channel M207, in particular, the canceling magnetic field generation devices M214 can be attached to the main magnet A101 together with the extraction channel M207 after the relative position with the extraction channel M207 is adjusted outside the main magnet A101. Moreover, the canceling magnetic field generation devices M214 may be fixed to the main magnetic pole M202 of the main magnet A101. In any case, since a large attractive force from the main magnet A101 is generated in the canceling magnetic field generation devices M214, the canceling magnetic field generation devices M214 are fixed using a non-magnetic material having high strength. A material such as stainless steel or carbon fiber reinforced plastic, for example, may be used for the jig or the position adjustment mechanism described above.

In the eccentric trajectory-type circular accelerator, the low-energy beam circulates on the side further inward than the high-energy beam. In addition, the amount of displacement of the beam from the closed orbit due to the peeler magnetic field is smaller as the energy of the beam is smaller. Therefore, it is more difficult to extract the beam as the energy of the beam is lower. For efficient extraction of the low-energy beam, it is necessary to arrange the extraction channel M207 at a location close to the trajectory aggregation portion of the beam trajectory. However, if the extraction channel M207 is located at a position close to the trajectory aggregation portion, the peeler magnetic field is disturbed by the disturbance magnetic field generated by the extraction channel M207, and it is not possible to satisfactorily extract the beam.

If the configuration described in the present embodiment is adopted, the canceling magnetic field generation devices M214 provided on the inner peripheral side of the extraction channel M207 can cancel out the disturbance magnetic field generated in the peeler portion by the extraction channel M207 with the canceling magnetic field with the polarity opposite thereto. As a result, it is possible to reduce the disturbance to the peeler magnetic field when the extraction channel M207 is located at a position close to the peeler portion. Therefore, it is possible to efficiently and satisfactorily extract the beam.

Also, the canceling magnetic field generation devices M214 are arranged such that the canceling magnetic field generation devices M214 overlap the peeler magnetic field region M205 in the present embodiment. Therefore, it is possible to more appropriately cancel out the disturbance magnetic field formed by the extraction channel generated in the peeler magnetic field region 205 which is likely to affect a behavior of the beam.

In addition, it is possible to cancel out the extraction channel magnetic field even in a case where the extraction channel partitioning wall portion M207*a* which greatly affects the peeler magnetic field region 205 is present, and to thereby efficiently and satisfactorily extract the beam in the present embodiment.

Furthermore, since the canceling magnetic field generation devices M214 are arranged at positions away from the main magnetic pole M202, the canceling magnetic field generation devices M214 can be arranged at positions close to the central plane M233 in the present embodiment. Therefore, it is possible to reduce influences of the canceling magnetic field generation devices M214 on the surroundings.

In Addition, since the canceling magnetic field generation devices M214 are formed of a ferromagnetic body such as iron, it is possible to cancel out a high-intensity disturbance magnetic field with a relatively small volume in the present embodiment.

In addition, since the canceling magnetic field generation devices M214 are determined in accordance with the magnetic field distribution of the disturbance magnetic field generated in the resonance magnetic field region, it is possible to appropriately cancel out the disturbance magnetic field in the present embodiment.

Also, the beam displacement device applies disturbance to the beam that has been displaced outward to generate a peeler magnetic field that causes the beam to move outward in the radial direction in the present embodiment. Therefore, it is possible to more satisfactorily extract the beam.

Also, the beam displacement device generates a regenerator magnetic field that gives disturbance to the beam that has been displaced outward to cause the beam to move to inside, generates the peeler magnetic field on the upstream side, and generates the regenerator magnetic field on the downstream side, with respect to the beam traveling direction in the present embodiment. Therefore, it is possible to more satisfactorily extract the beam.

Second Embodiment

The present embodiment is different from the first embodiment in that an accelerator A100 includes canceling magnetic field generation devices formed of permanent magnets instead of the canceling magnetic field generation device M214 formed of the ferromagnetic material. Hereinafter, configurations different from those in the first embodiment will be mainly described.

Figure 8:
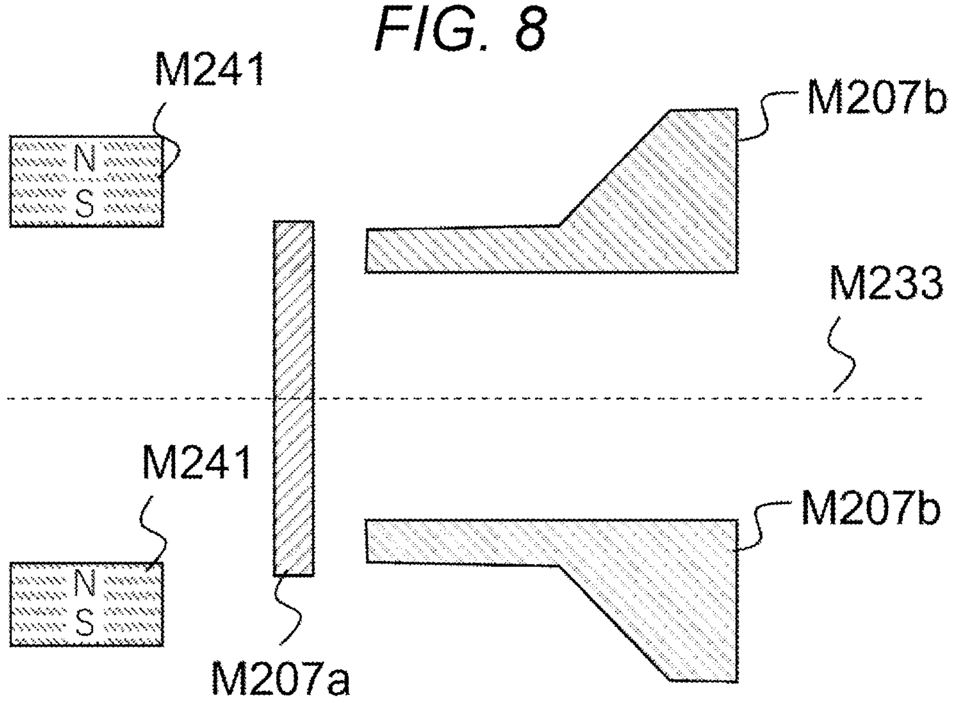
FIG. 8 is a diagram illustrating an example of canceling magnetic field generation devices according to a second embodiment of the present disclosure.

FIG. 8 is a diagram illustrating an example of the canceling magnetic field generation devices according to the present embodiment and schematically illustrates a longitudinal section along a vertical plane of a main magnet A101 in the vicinity of a central plane M233.

As illustrated in FIG. 8, a plurality of (in the drawing, a pair of) canceling magnetic field generation devices M241 formed of permanent magnets are arranged plane-symmetrically with respect to the central plane M233 such that a beam traveling direction is sandwiched therebetween. In addition, the canceling magnetic field generation devices M241 are arranged to have the same polarity as that of a magnetic field generated by the main magnet A101, that is, a polarity opposite to a disturbance magnetic field generated by an extraction channel M207. As a result, it is possible to reduce the disturbance magnetic field generated by the extraction channel M207 with a canceling magnetic field generated by the canceling magnetic field generation devices M241 similarly to the first embodiment in the present embodiment as well.

Note that residual magnetization of the permanent magnets is about 1 tesla at the maximum at present and is weaker than saturation magnetization (about 2 tesla in a case of iron) of the ferromagnetic material. Therefore, in a case where the main magnet A101 has a high magnetic field intensity (equal to or greater than 2 tesla, for example), there is a concern that the volume of the canceling magnetic field generation devices M214 may increase in order to appropriately cancel out the disturbance magnetic field. In addition, since magnetism of the permanent magnets such as a neodymium magnets or ferrite magnets changes depending on the temperature, it is necessary to consider stability of the magnetic field at the time of adjustment and operation. In addition, some permanent magnets are materials that are easily damaged and have low workablity, and it is thus difficult to use them for the canceling magnetic field generation devices M214 that require to be finely worked for their shapes. Therefore, it is more convenient to form the canceling magnetic field generation devices M214 using a ferromagnetic material as in the first embodiment.

Figure 9:
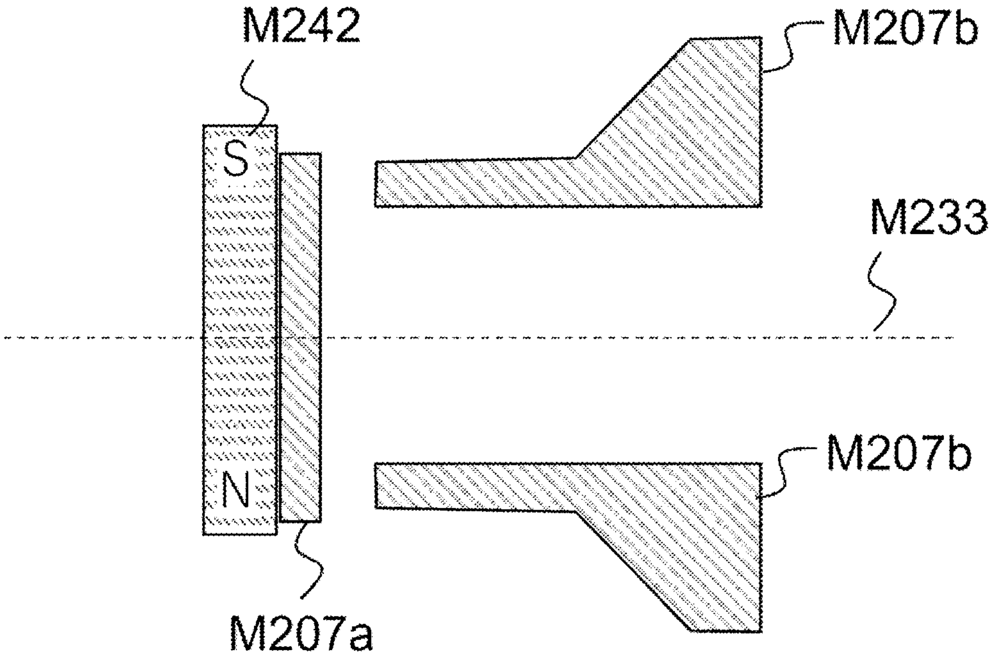
FIG. 9 is diagram illustrating another example of the canceling magnetic field generation device according to the second embodiment of the present disclosure.

FIG. 9 is a diagram illustrating another example of a canceling magnetic field generation device formed of a permanent magnet.

The canceling magnetic field generation device M242 illustrated in FIG. 9 is integrally formed and attached to an extraction channel partitioning wall portion M207*a* unlike the canceling magnetic field generation devices M241 that are formed of a pair of permanent magnets spaced apart from each other with the central plane M233 sandwiched therebetween as illustrated in FIG. 8. In addition, the canceling magnetic field generation device M242 is arranged to have a polarity opposite to that of a disturbance magnetic field generated by the extraction channel M207. Specifically, the canceling magnetic field generation device M242 is arranged to have a magnetic moment opposite to a magnetic moment that the extraction channel partitioning wall portion M207*a* has. Even in this case, it is possible to reduce the disturbance magnetic field generated by the extraction channel M207 with a canceling magnetic field of the canceling magnetic field generation device M241.

Note that in the example of FIG. 9, the canceling magnetic field generation device M242 is located close to the extraction channel partitioning wall portion M207*a*, and there is thus a concern that an extraction channel magnetic field on the radially outer side is also reduced by the canceling magnetic field generation device M242, and it becomes difficult to deflect the beam to the extraction trajectory. For this reason, it is necessary to design the extraction channel M207 and the canceling magnetic field generation device M214 such that sufficient beam deflection can be obtained. In addition, since the thickness of the canceling magnetic field generation device M242 is added to the extraction channel partitioning wall portion M207*a*, a larger turn separation is required. As a result, it is substantially necessary to move the inlet of the extraction channel M207 away by the amount corresponding to the thickness of the canceling magnetic field generation device M242, and there is thus a concern that this may lead to degradation of beam extraction efficiency. Therefore, it is more convenient to use the canceling magnetic field generation device M214 formed of a ferromagnetic material as in the first embodiment.

Since it is possible to achieve the reduction with the canceling magnetic field of the canceling magnetic field generation device M241 even if the canceling magnetic field generation devices M241 and M242 formed of permanent magnets are used as in the present embodiment as described above, it is possible to efficiently and satisfactorily extract beams with all energies to be extracted.

Third Embodiment

The present embodiment is different from the first embodiment in that an accelerator A100 includes canceling magnetic field generation devices formed of coils instead of the canceling magnetic field generation devices M214 formed of the ferromagnetic material.

Figure 10:
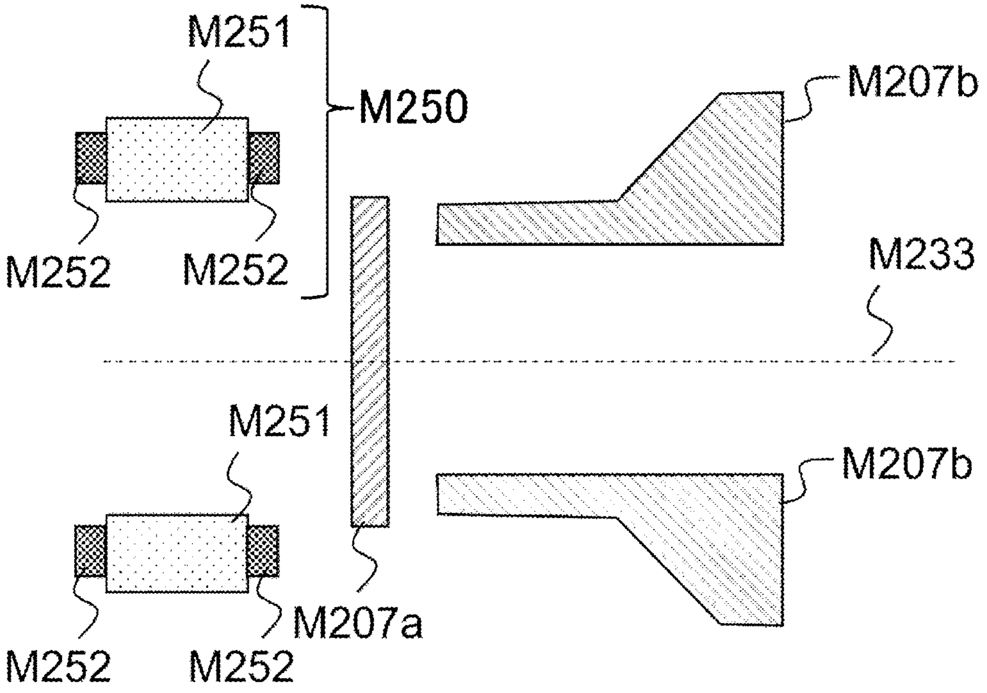
FIG. 10 is a diagram illustrating an arrangement example of a canceling magnetic field generation device according to a third embodiment of the present disclosure.

FIG. 10 is a diagram illustrating an example of the canceling magnetic field generation device according to the present embodiment and schematically illustrates a longitudinal section along a vertical plane of a main magnet A101 in the vicinity of a central plane M233.

A canceling magnetic field generation device M250 illustrated in FIG. 10 includes a core portion M251 and a peeler magnetic field generation coil M252. The core portion M251 may be formed of a ferromagnetic body such as iron, or may be a coil bobbin formed of a resin having electrical insulation properties or the like. The peeler magnetic field generation coil M252 is a coil wound around the core portion M251.

Also, a plurality of (in the drawing, a pair of) canceling magnetic field generation devices M250 are arranged plane-symmetrically with respect to the central plane M233 such that a beam traveling region is sandwiched therebetween. In addition, the canceling magnetic field generation devices M250 are arranged and controlled to have the same polarity as that of a magnetic field generated by the main magnet A101, that is, a polarity opposite to that of a disturbance magnetic field generated by an extraction channel M207. Note that control (for example, adjustment of the current to be supplied) of the peeler magnetic field generation coil M252 is performed by, for example, a control apparatus A140. In this manner, it is possible to reduce the disturbance magnetic field generated by the extraction channel M207 with a canceling magnetic field generated by the canceling magnetic field generation devices M250 similarly to the first embodiment in the present embodiment as well.

The intensity of the magnetic field generated in the peeler magnetic field region by the extraction channel M207 is about several hundreds of millitesla in a case of a main magnet of about 2 tesla. In order to generate a magnetic field of several hundreds of millitesla only by a coil, a large capacity power source, a hollow conductor, a feedthrough, and the like are required, and there is thus a concern that this may lead to an increase in size of the device that generates the canceling magnetic field. Therefore, the canceling magnetic field is adjusted by winding the peeler magnetic field generation coil M252 around the core portion M251 in the present embodiment. In this case, the canceling magnetic field can be adjusted by changing the current to be supplied to the peeler magnetic field generation coil M252. In other words, it is possible to adjust a beam extraction ability during operation of the accelerator A100, for example, by using the canceling magnetic field generation devices M250. For this reason, it is possible to shorten a period of time required for beam adjustment and to absorb a decrease in beam extraction efficiency due to mixing of the disturbance magnetic field after the main magnet is disassembled for maintenance.

Figure 11:
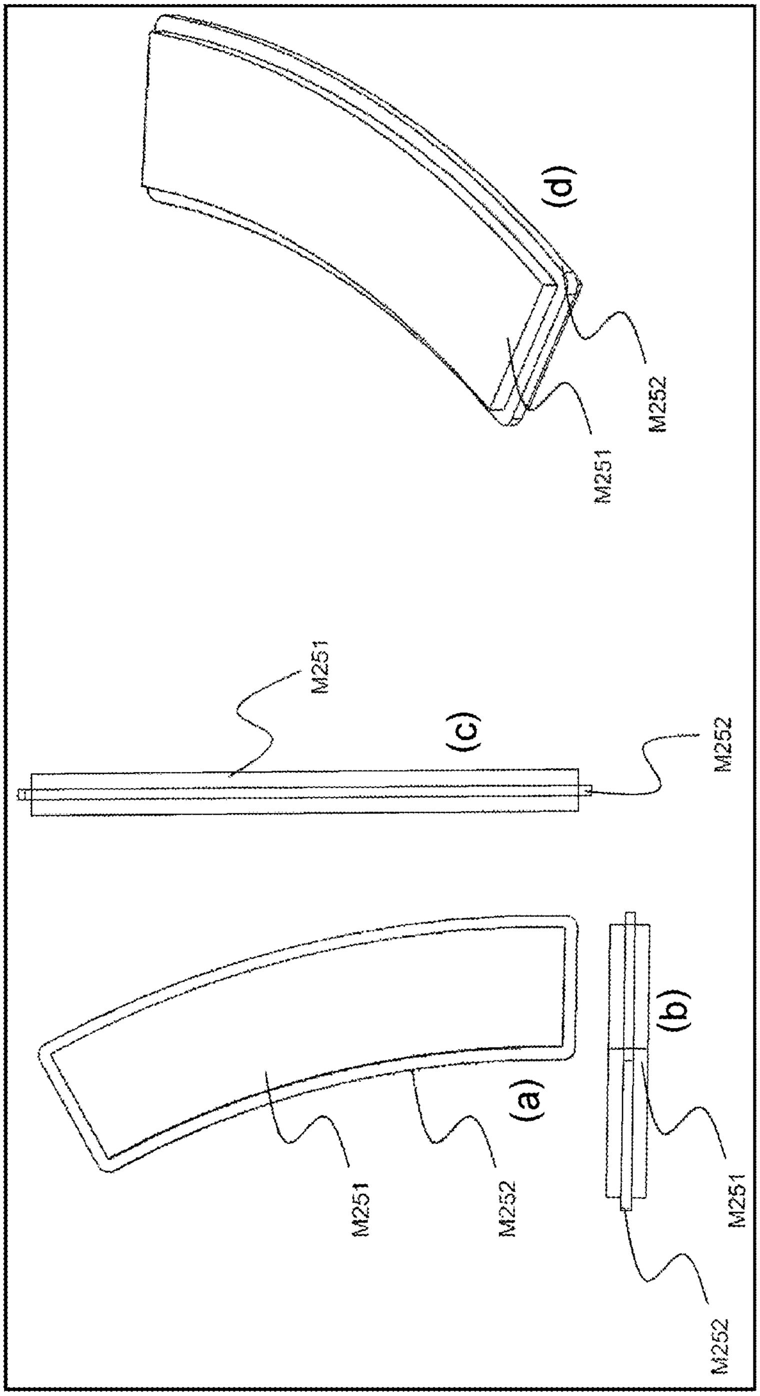
FIG. 11 is a diagram illustrating a structure example of the canceling magnetic field generation device according to the third embodiment of the present disclosure.

FIG. 11 is a diagram illustrating an example of the canceling magnetic field generation device M250. In FIG.

11, only one of the pair of canceling magnetic field generation devices M250 arranged on the upper and lower sides with the central plane M233 sandwiched therebetween is illustrated. Also, FIG. 11(*a*) is a plan view seen from a side opposite to the central plane M233, FIG. 11(*b*) is a plan view seen from the right side of FIG. 10, FIG. 11(*c*) is a plan view seen from a direction perpendicular to FIG. 3, and FIG. 11(*d*) is a perspective view seen from the side of the central plane M233.

As illustrated in FIG. 11, the core portion M251 of the canceling magnetic field generation device M250 has a curved shape along the peeler magnetic field region M205. Also, the peeler magnetic field generation coil M252 is wound around the core portion M251 in a clockwise or counterclockwise direction around a direction substantially perpendicular to the central plane M233 as an axis.

As described above, the canceling magnetic field generation devices M250 are formed of coils, and it is possible to adjust the beam extraction ability of the beam during operation of the accelerator A100 and to thereby facilitate adjustment to efficiently and satisfactorily extracting the beam in the present embodiment.

Each embodiment of the present disclosure described above is an example for explaining the present disclosure, and the scope of the present disclosure is not intended only to those embodiments. Those skilled in the art can practice the present disclosure in various other aspects without departing from the scope of the present disclosure.

REFERENCE SIGNS LIST

A100 accelerator
A101 main magnet
A102 ion source system
A103 extraction port
A110 beam transport line
A133 irradiation device
A140 control apparatus
M201 yoke
M202 main magnetic pole
M203 coil
M204 RF kicker
M205 peeler magnetic field region
M206 regenerator magnetic field region
M207 extraction channel
M207*a* extraction channel partitioning wall portion
M207*b* extraction channel adjustment portion
M208 extraction port through-hole
M209 acceleration electrode through-hole
M210 acceleration electrode
M211 rotating capacitor
M212 rotating capacitor driving power machine
M214, M241, M242, M250 canceling magnetic field generation device
M251 core portion
M252 peeler magnetic field generation coil

The invention claimed is:

1. An accelerator that accelerates an ion beam while causing the ion beam to circulate by a main magnetic field and an acceleration radiofrequency electric field, the accelerator comprising:
- a main magnetic field generation device that applies the main magnetic field to a space between a plurality of main magnetic poles arranged to face each other;
- a beam displacement device that causes the ion beam circulating in a main magnetic field region to which the main magnetic field is applied to be displaced to outside of the main magnetic field region;
- an extraction channel magnetic field generation device that generates an extraction channel magnetic field to extract the ion beam that has been moved to the outside; and
- a canceling magnetic field generation device that is provided to be closer to an inner peripheral side than the extraction channel magnetic field generation device and generates a canceling magnetic field with a polarity opposite to a polarity of the extraction channel magnetic field.

2. The accelerator according to claim 1, wherein the extraction channel magnetic field generation device is provided in an outer peripheral portion of a peeler magnetic field region where a peeler magnetic field that by disturbing the ion beam that has been displaced to an outer periphery of the main magnetic field region, which is outside of the main magnetic field region, causes the ion beam to move outward is generated.

3. The accelerator according to claim 2, wherein the canceling magnetic field generation device is provided above the peeler magnetic field region.

4. The accelerator according to claim 1, wherein the extraction channel magnetic field generation device includes a partitioning wall portion that passes through a traveling plane through which the ion beam travels and extends in a direction substantially perpendicularly intersecting the traveling plane.

5. The accelerator according to claim 1, wherein a plurality of the canceling magnetic field generation devices are plane-symmetrically arranged with respect to a traveling plane through which the ion beam travels.

6. The accelerator according to claim 1, wherein the canceling magnetic field generation device is arranged at a position spaced apart from the main magnetic pole in an axial direction perpendicularly intersecting a traveling plane through which the ion beam travels in the space.

7. The accelerator according to claim 1, wherein the canceling magnetic field generation device is a ferromagnetic body, a permanent magnet, or a coil.

8. The accelerator according to claim 7, wherein
- the canceling magnetic field generation device is a ferromagnetic body, and
- the ferromagnetic body is iron.

9. The accelerator according to claim 7, wherein
- the canceling magnetic field generation device is a coil, and
- a control apparatus that adjusts a current to be supplied to the coil is further included.

10. The accelerator according to claim 4, wherein
- the canceling magnetic field generation device is a permanent magnet, and
- the permanent magnet is attached to the partitioning wall portion.

11. The accelerator according to claim 2, wherein a shape of the canceling magnetic field generation device is defined in accordance with a magnetic field distribution of the extraction channel magnetic field generated in the peeler magnetic field region.

12. The accelerator according to claim 1, wherein the beam displacement device generates a peeler magnetic field that by disturbing the ion beam that has been displaced to an outer periphery of the main magnetic field region, which is outside of the main magnetic field region, causes the ion beam to move outward.

13. The accelerator according to claim 12, wherein the beam displacement device generates a regenerator magnetic field that by disturbing the ion beam that has been displaced to an outer periphery of the main magnetic field region, which is outside of the main magnetic field region, causes the ion beam to move inward, and the peeler magnetic field is generated on an upstream side, and the regenerator magnetic field is generated on a downstream side, with respect to a beam traveling direction.

14. A particle therapy apparatus comprising:

an accelerator that accelerates an ion beam while causing the ion beam to circulate by a main magnetic field and an acceleration radiofrequency electric field; and an irradiation device that performs irradiation with the ion beam extracted from the accelerator, wherein the accelerator includes a main magnetic field generation device that applies the main magnetic field to a space between a plurality of main magnetic poles arranged to face each other, a beam displacement device that causes the ion beam circulating in a main magnetic field region to which the main magnetic field is applied to be displaced to outside of the main magnetic field region, an extraction channel magnetic field generation device that generates an extraction channel magnetic field to extract the ion beam that has been moved to the outside, and a canceling magnetic field generation device that is provided to be closer to an inner peripheral side than the extraction channel magnetic field generation device and generates a canceling magnetic field with a polarity opposite to a polarity of the extraction channel magnetic field.

* * * * *